Dec. 26, 1939.   M. C. LUMLEY   2,184,893
MIRROR MOUNTING
Filed March 15, 1937   2 Sheets-Sheet 1
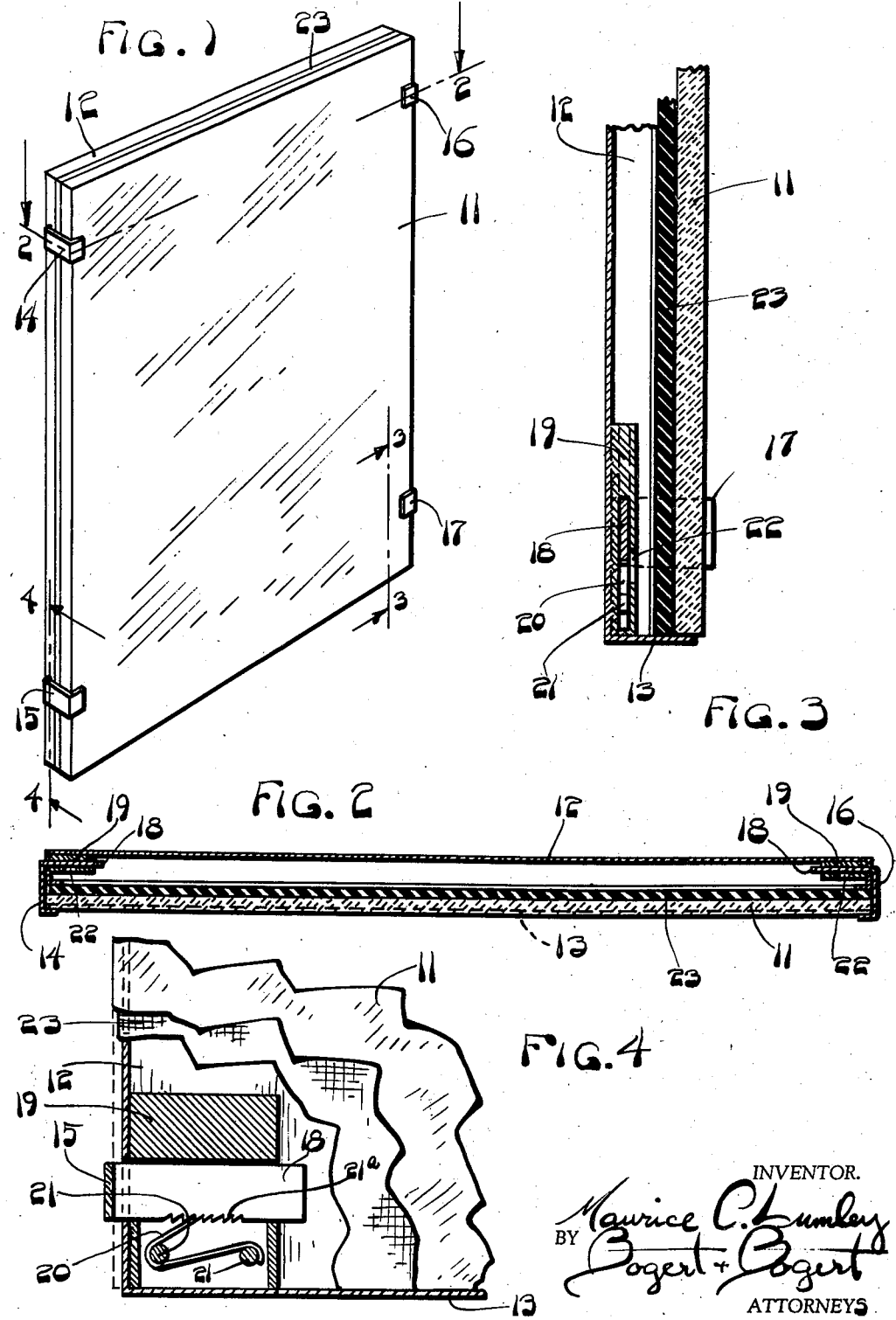
INVENTOR.
Maurice C. Lumley
BY Bogert + Bogert
ATTORNEYS.

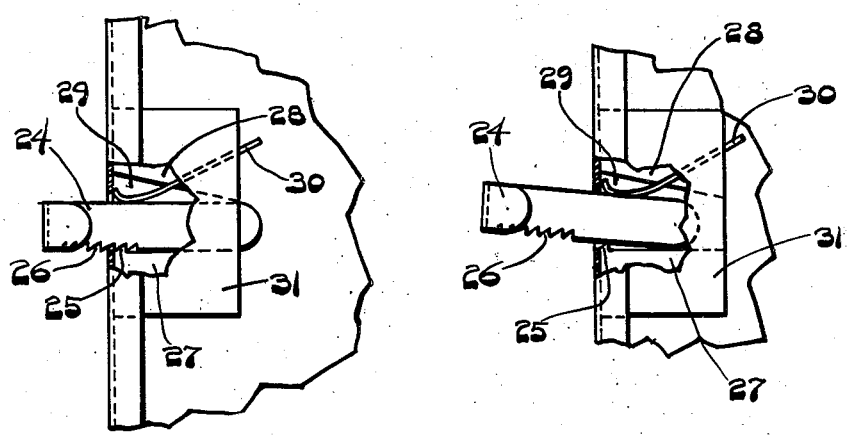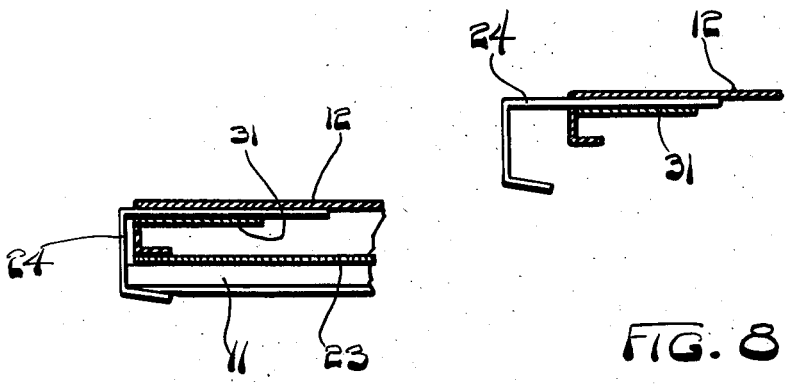

Patented Dec. 26, 1939

2,184,893

UNITED STATES PATENT OFFICE 2,184,893

MIRROR MOUNTING

Maurice C. Lumley, Norwood, Ohio, assignor to The F. H. Lawson Company, Cincinnati, Ohio, a corporation of Ohio Application March 15, 1937, Serial No. 130,951

1 Claim. (Cl. 88—96)

This invention is especially adaptable to the mounting of mirrors and the like on metal backs for wall use or for the doors of bath room cabinets and similar structures.

An object of the invention is to provide an unique means for mounting mirrors, whereby damage of the glass thereof, such as edge chipping or the scratching of the silvering from the back of the mirror, is overcome in the mounting operation.

A further object of the invention is to produce a mounting clip for mounting mirrors quickly and for holding them firmly on their mounting backs without having to resort to alterations either to the mirror or its mounting elements in the event of variations of size or other inequalities of manufacture which occur in spite of all normal precautions to secure uniform results, or without having to resort to the use of tools in performing the mounting operation.

A further object is to produce a mounting clip for mirrors and the like, in which release of the mounted mirror is obtainable as readily and without having to resort to the use of tools, as in the act of mounting the mirror.

A further object is to produce such a mounting clip for mirrors as will permit of mirror release and mirror replacement, in the event of breakage, scratching, chipping, and the like, without having to deform, destroy or substitute new clips and without having to resort to filing, refitting, soldering, riveting or other operations requiring skilled labor or devices for their accomplishment.

These and other objects are attained in the mirror mounting described in the following specification and illustrated in the accompanying drawings, in which:

Fig. 1 is a perspective view of a mirror and backing mounted according to the provisions of my invention.

Fig. 2 is a somewhat sectional view taken on the line 2—2 of Fig. 1.

Fig. 3 is an enlarged fragmental sectional view of the invention and taken on the line 3—3 of Fig. 1.

Fig. 4 is a materially enlarged fragmental sectional view with parts broken away for convenience of illustration.

Fig. 5 is a fragmental sectional elevation of a mounting clip construction, also embodying my invention, showing a clip in somewhat extended and locked position relatively to its retaining elements.

Fig. 6 shows the construction disclosed in Fig. 5, in clip released condition, as upon preparing for mounting a mirror or releasing it.

Fig. 7 shows, in horizontal section through the clip mounting, the manner in which the mirror is gripped by the clip.

Fig. 8 shows, in horizontal section, as in Fig. 7, the manner in which the clip occupies a position awaiting mirror placement.

A typical mirror 11 and its backing 12 is disclosed for the purpose of describing my invention. The type of construction disclosed is typical of that found in bath room cabinets and wall mirrors. The backing is of metal and, usually for purposes of rigidity, may be made pan-like in form, with an inturned flange edge at its top and along its opposite vertical edges, a shelf 13 being made of the lower edge, as shown more distinctly on Fig. 3, whereon the mirror's lower edge rests for support. Clips for gripping the vertical edges of the mirror, in order to retain the mirror on the shelf, are in themselves old, as is also the shelf upon which the mirror rests. However, in the invention I have made, the novelty lies in the manner in which the clips are formed and mounted.

Near the top and bottom edges of the mirror and/or at such other intervals as the mirror design or preference may dictate, I locate clips 14, 15, 16 and 17. These clips have their forward ends turned to form fingers extending over the mirror edge, while their rear ends 18 are turned to be parallel therewith but materially longer as shown particularly in Figs. 2 and 4, to occupy the channels in the clip locks 19 located preferably in the corners of the pan-like backing.

Referring especially to Fig. 4, the formation of and cooperation of the clip ends 18 and clip locks 19 are shown. In some suitable and simple manner the clip lock is provided with a pawl which may be merely the end of a spring 20 mounted upon pins 21 forming spacers between the plates of the locks, the free end of each of these springs extending into the channel which receives the rear ends of the clips. The rear ends of the clips are formed with notches which form teeth 21a on the clip edges which are engaged with the spring ends. Thereby the cooperating spring ends and teeth may be said to be as a pawl and ratchet construction which permit the clips to be slipped into position, as the drawing shows, with the number of teeth engaged by the pawl varying because of the possible variation in width of the mirror or of the backing itself, occurring from manufacturing variables, even the clips themselves being a source of variation which occasions indeterminate numbers of teeth so engaged.

Nevertheless, regardless of the teeth engaged, the operation of the simple clip and lock therefor, is such that mere pressure of the fingers of the operative is all that is required to secure the mirror in mounted position, tools of no kind being required, the ratchet-like operation of the clip teeth over the end of the pawl-like spring, preventing withdrawal of the clip.

In no event can the clip become disengaged or deliberately be disengaged from the lock until some accident befalls the mirror, in which event it may be desirable to provide some simple means for causing the clip to become disengaged, such as by providing or making a hole in the wall of the lock as suggested at 22 in Fig. 3, in register with the teeth and engaging end of the spring, whereby a nail, screw driver blade, or other means may be inserted in order to move the spring free of the teeth thereby permitting removal of the clip.

In Figs. 5 to 8 inclusive the clip shown is quite similar to the one just described. In fact the clip element 24 is identical with that of clips 14, 15, 16 and 17 just described, the difference lying in the provision of a stationary pawl 25 which extends from lower guide plate 27 for engagement with the teeth 26 extending from the lower edge of clip 24. An upper guide plate 28 is shaped to form with the lower guide plate 27 a wedge shaped space 29 wherein the clip 24 is located for movements which will be described. The upper guide plate 28 carries a spring 30, the lower end of which engages the clip and retains the teeth 26 yieldingly in engagement with the pawl 25. A cover plate 31 retains the clip in the space 29.

Thus, to cause the clip 24 to function, it is released from its tooth-like engagement by lifting it to tipped position and pulling outwardly, as shown in Fig. 6, against the pressure of spring 30. Then, upon releasing the clip, and after placing the mirror 11 in position with the pad 23 back of it, giving the clip an inward push, the ratchet-like action of the tooth-pawl cooperation will retain the clip in the mirror-gripping position shown in Fig. 7.

Obviously, mere lifting upon the hook-like outer end of the clip will permit it to be drawn away from the mirror, whereby the mirror may be removed, or, if the mirror has been broken, the withdrawal of the clip will clear the way for placing and clamping a new mirror in position, as has been described.

Having thus described my invention what I claim is:

A mounting for mirrors, consisting of a backing sheet adapted to support a mirror thereon, locks on the sheet, and clips rockably mounted in spaced relation on the backing sheet and gripping the mirror, said locks and clips having pawl and ratchet construction, whereby mirror gripping movement of the clips is permitted and mirror releasing movement prevented, said locks permitting rocking movement of the clips to disengage the pawl and ratchet elements of the mounting, whereby the clips may be disengaged from the mirror.

MAURICE C. LUMLEY.